US010902655B1

(12) United States Patent
Snyder

(10) Patent No.: US 10,902,655 B1
(45) Date of Patent: Jan. 26, 2021

(54) EDITING CACHED MAP TITLES

(71) Applicant: United Parcel Service of America, Inc., Atlanta, GA (US)

(72) Inventor: Steve Snyder, Bel Air, MD (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 0 days.

(21) Appl. No.: 15/420,475

(22) Filed: Jan. 31, 2017

Related U.S. Application Data

(60) Provisional application No. 62/289,613, filed on Feb. 1, 2016.

(51) Int. Cl.
*G06T 11/60* (2006.01)
*G06T 1/60* (2006.01)
*G06T 3/40* (2006.01)
*G09G 5/393* (2006.01)

(52) U.S. Cl.
CPC ............ *G06T 11/60* (2013.01); *G06T 1/60* (2013.01); *G06T 3/40* (2013.01); *G06T 2200/16* (2013.01); *G09G 5/393* (2013.01); *G09G 2350/00* (2013.01); *G09G 2360/121* (2013.01); *G09G 2360/122* (2013.01); *G09G 2370/02* (2013.01)

(58) Field of Classification Search
CPC ... G06T 1/60; G06T 3/40; G06T 11/60; G06T 2200/16; G06F 17/30377; G06F 17/30241; G09G 2360/121; G09G 2360/122; G09G 2370/02; G09G 5/393; G09G 2350/00
See application file for complete search history.

(56) References Cited

U.S. PATENT DOCUMENTS

| | | | |
|---|---|---|---|
| 5,829,001 A * | 10/1998 | Li | G06F 17/30377 |
| 7,099,882 B2 | 8/2006 | McDonough | |
| 8,604,977 B2 | 12/2013 | Wilfert et al. | |
| 8,731,823 B2 | 5/2014 | Schunder et al. | |
| 8,799,799 B1 | 8/2014 | Cervelli et al. | |
| 2004/0193370 A1* | 9/2004 | Umezu | G01C 21/32 701/450 |
| 2009/0177706 A1* | 7/2009 | Takahata | G01C 21/32 |
| 2012/0209818 A1 | 8/2012 | Richter et al. | |

(Continued)

OTHER PUBLICATIONS

Merriam-Webster Online Dictionary, published at https://www.merriam-webster.com/dictionary/corresponds as of Apr. 25, 2009 at archive.org (Year: 2009).*

*Primary Examiner* — William A Beutel
(74) *Attorney, Agent, or Firm* — Shook, Hardy & Bacon, L.L.P.

(57) ABSTRACT

Computer program products, methods, systems, apparatus, and computing entities are provided for creating, modifying, and viewing map tile data. For example, a method may include accessing an update log to retrieve electronic update data associated with at least one update applied to a set of dynamic map data, determining, based on the electronic update data, at least one cached map tile associated with the at least one update, the at least one cached map tile comprising a first representation of at least one image, wherein the first representation reflects the set of dynamic map data prior to application of the at least one update applied to the dynamic map tile, and generating an updated cached map tile, wherein the updated cached map tile comprises a second representation of the at least one image.

10 Claims, 10 Drawing Sheets

(56) References Cited

U.S. PATENT DOCUMENTS

2012/0254804 A1* 10/2012 Sheha .................... G06Q 30/02
　　　　　　　　　　　　　　　　　　　　　715/834
2013/0304349 A1　　11/2013 Davidson
2015/0058305 A1*　 2/2015 Scharmann .......... G09B 29/106
　　　　　　　　　　　　　　　　　　　　　707/695
2015/0347457 A1* 12/2015 Zhu .................. G06F 17/30241
　　　　　　　　　　　　　　　　　　　　　707/743

* cited by examiner

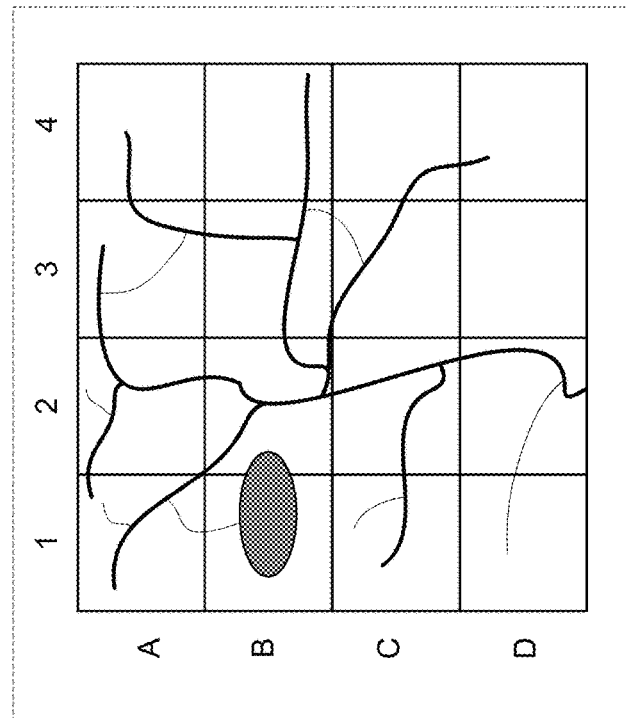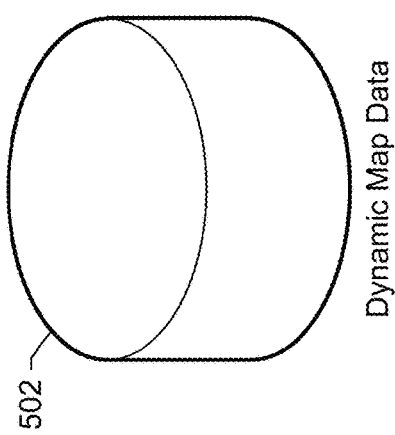
FIG. 5

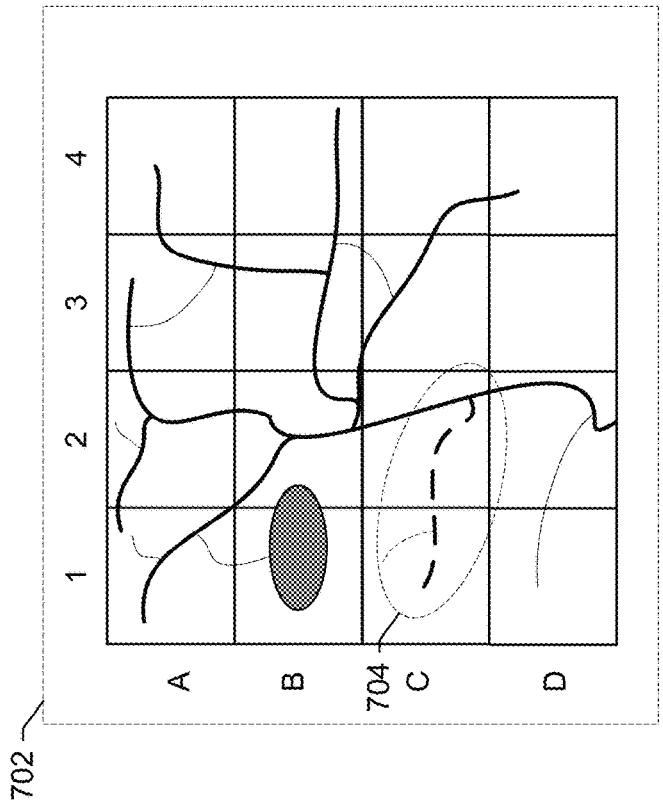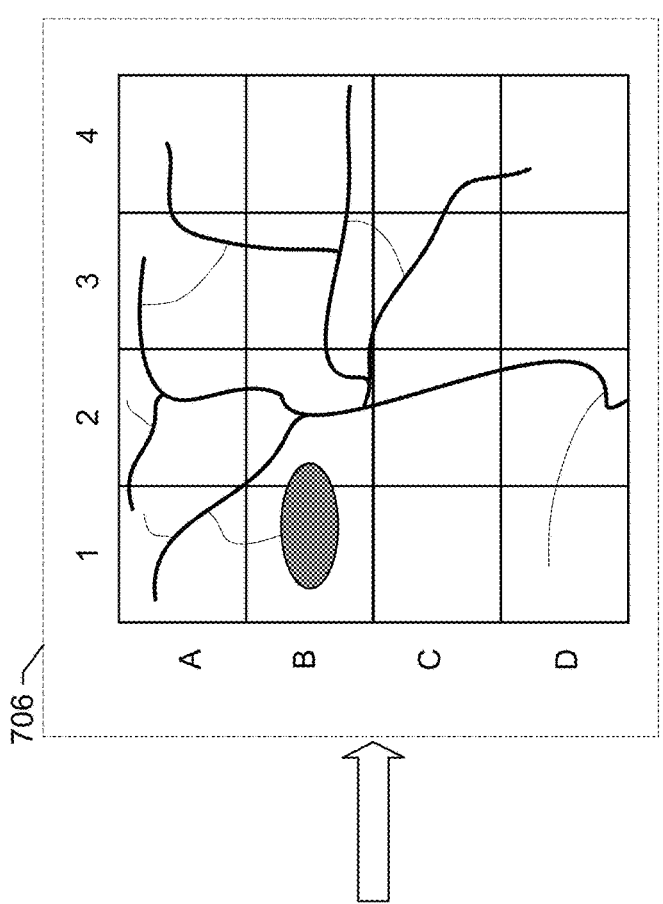
FIG. 7

EDITING CACHED MAP TITLES

CROSS-REFERENCE TO RELATED APPLICATIONS

This application claims priority to U.S. Provisional Application No. 62/289,613 filed Feb. 1, 2016, which is hereby incorporated herein in its entirety by reference.

BACKGROUND

New techniques and approaches are needed for managing map tiles stored in navigational databases.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-8 are diagrams illustrating a relationship between dynamic map data and cached map tiles in accordance with certain embodiments of the present invention.

DESCRIPTION

Figure 1:
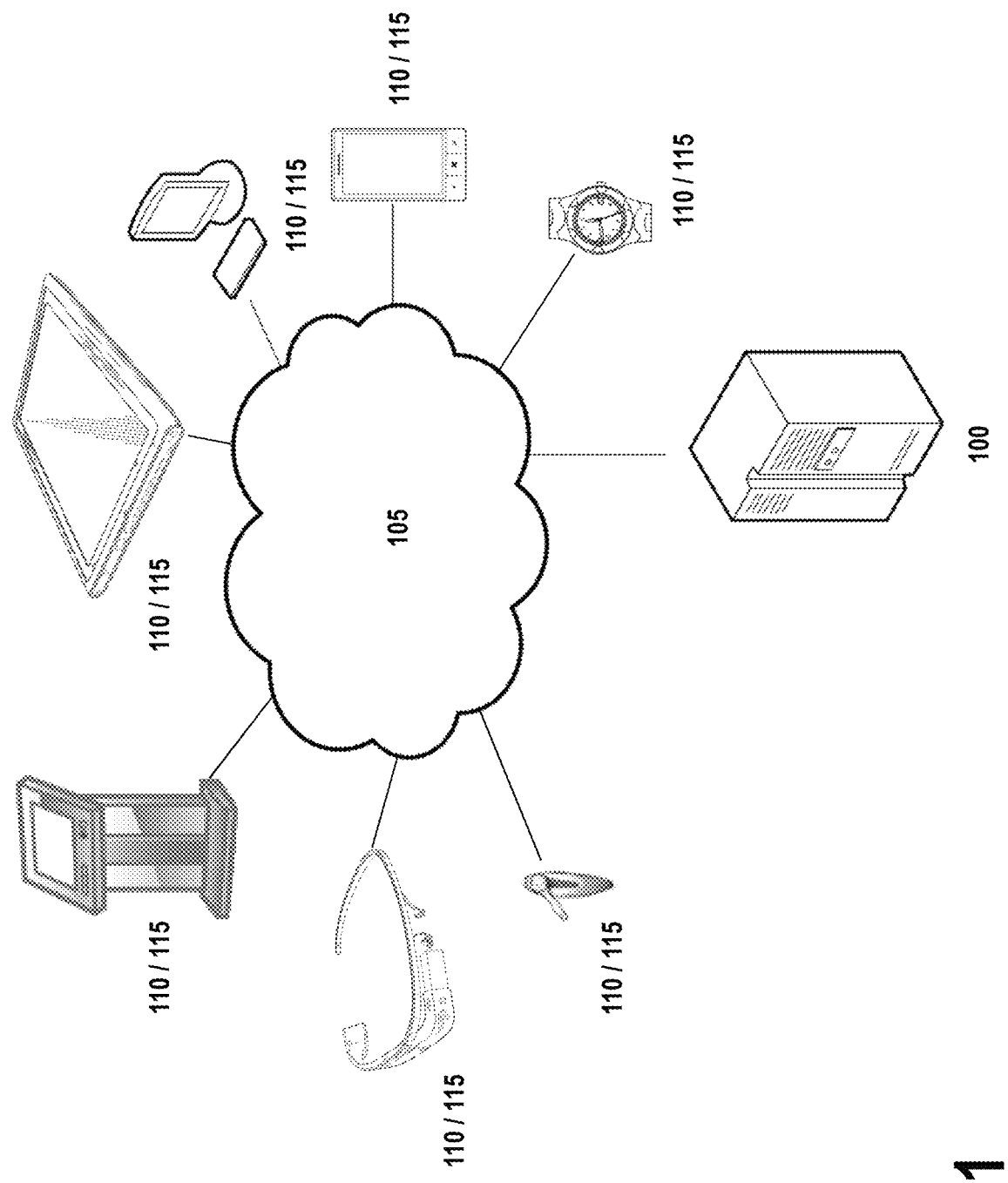
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. OVERVIEW AND DEFINITIONS

Embodiments of the present invention generally relate to systems, methods, apparatuses, and computer program products for management and/or maintenance of map tile databases. In order to reduce the amount of data processing overhead required for location-based service systems and other systems that provide mapping and routing functionality, databases of map data are frequently maintained as a list of map elements (e.g., road network segments, point of interest coordinates, locations of geographic features) and/or a series of "map tiles", "tiles", or "map tile data" that correspond to particular geographic regions. This data may include information related various map elements such as points of interest (e.g., businesses, addresses of user contacts), geographic features (e.g., bodies of water, elevation changes, forests), images (e.g., a satellite image of the region or an abstraction of geographic features and navigation routes within the region) and navigation routes (e.g., roads, tunnels, bridges, rails, public transit routes, walking paths), along with coordinates indicating the physical location of each of these elements. In operation, these systems may load only map data that pertains to a particular geographic region or regions that are in use by the system at the time of operation. For example, a navigation system may only load map data that pertains to a region in which the navigation system is operating, the navigation system may only load map data associated with a route a user has indicated they intend to travel, or the navigation system may only load map data associated with a portion of a map displayed in a user interface. Such selective loading of map data advantageously reduces the memory footprint of the location-based service system by reducing the amount of map data loaded into memory at any given time. In embodiments where map data is requested from a remote server, selective loading of map data also advantageously reduces the network bandwidth required to use the location-based service system by only requesting map data likely to be used by the location-based service system.

Some location-based service systems have extended the concept of selective loading of map data through the use of "cached tile data." For the purposes of this disclosure, the terms "cached tiles", "cached map tiles", and "cached map tile data" are intended to refer to map tiles that are derived from a set of source map data, such that the cached tiles are derived from the set of map data. For example, a cached map tile associated with a region associated with a set of map data may include only an image of the region, only an image of the region with certain elements removed (e.g., depicting only major highways but not side roads), major roads but not public transit routes, or the like. The term "source map data", refers to a source set of data that includes information sufficient to derive the one or more cached map tiles. For example, the source map data may include road network data, point of interest locations, information about geographic features, or the like. The source map data may be used to generate one or more images which correspond to the cached tiles.

It should be appreciated that, in some embodiments, multiple layers of abstraction may be employed, such that a cached map tiles serve as source map data for other cached map tiles, such as in a scenario where three or more layers of abstraction are employed (e.g., multiple zoom levels with different associated types or numbers of map elements).

A cached map tile may correspond to a plurality of other cached map tiles, such that the cached map tiles comprise fewer navigation elements than the aggregate total of all of the cached map tiles used to derive that cached map tile, even if, in some cases, the cached map tile may include every element of one or more of the other cached map tiles.

It should be appreciated that, while various example embodiments may be described with respect to the use of a zoomed-out image corresponding to a particular source map data, various embodiments of the cached map tiles may include various other combinations of map elements included in the source map data.

In this regard, the use of cached map tiles may enable location-based service systems to use less memory and/or network bandwidth while still maintaining the ability to view one or more map elements of the region associated with the cached tile, as cached map tiles typically require a smaller memory footprint than the aggregate memory footprint of the source map data from which the cached map tiles are derived.

However, because cached map tiles exist as separate entities from the source map data from which they are derived, the use of cached map tiles in a map database that may receive dynamic updates presents new technical challenges. Every time an update to a map element of a set of source map data is propagated to the set of cached map tiles, every cached map tile for which the set of map data functions as a source must also be updated. To overcome this problem, map database maintenance systems have, in the past, scheduled a periodic update all cached map tiles for one or more regions associated with the set of map data. However, the inventors have recognized that such an approach results in many cached map tiles being regenerated when there have been no changes to their corresponding source map data.

The inventors have identified this problem and other technical problems associated with the use of cached map tiles. To address these problems, the inventors, through applied effort and ingenuity, have developed embodiments of the present invention that serve to enable selective updating of cached map tile data in an efficient manner. In this regard, the inventors have developed systems that are operable to implement dynamic updates to a set of map data. In response to receiving updates to map tile data, embodiments identify the cached map tiles to which the updated map data corresponds. Embodiments further implement systems to selectively update those cached map tiles that correspond to the updated map data. Further embodiments implement tracking and queuing systems for selectively controlling whether and when updates for map data are received, a status queue for updates that have been propagated to a set of map data, and a scheduling system for updating cached map tiles in response to various criteria. Embodiments also provide for management of the cached map tile update process, access and concurrency control for processes updating the map data and cached map tile data, and verification of the success of update operations.

For the purposes of this disclosure, the term "location-based service system" refers to any system that may employ map data to present information about a given geographic region. Such systems may present said geographic information to a user via a display, or to other systems via various networking and data transmission protocols, buses, and the like. For example, location-based service systems may include navigation systems (e.g., vehicle route-finding systems), map display systems (e.g., websites displaying map data), surveying or data entry systems (e.g., systems supporting the entry or modification of map data), or the like.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 provides an illustration of an exemplary embodiment of the present invention. As shown in FIG. 1, this particular embodiment may include one or more management computing entities 100, one or more networks 105, one or more user computing entities 110, and one or more mobile computing entities 115. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
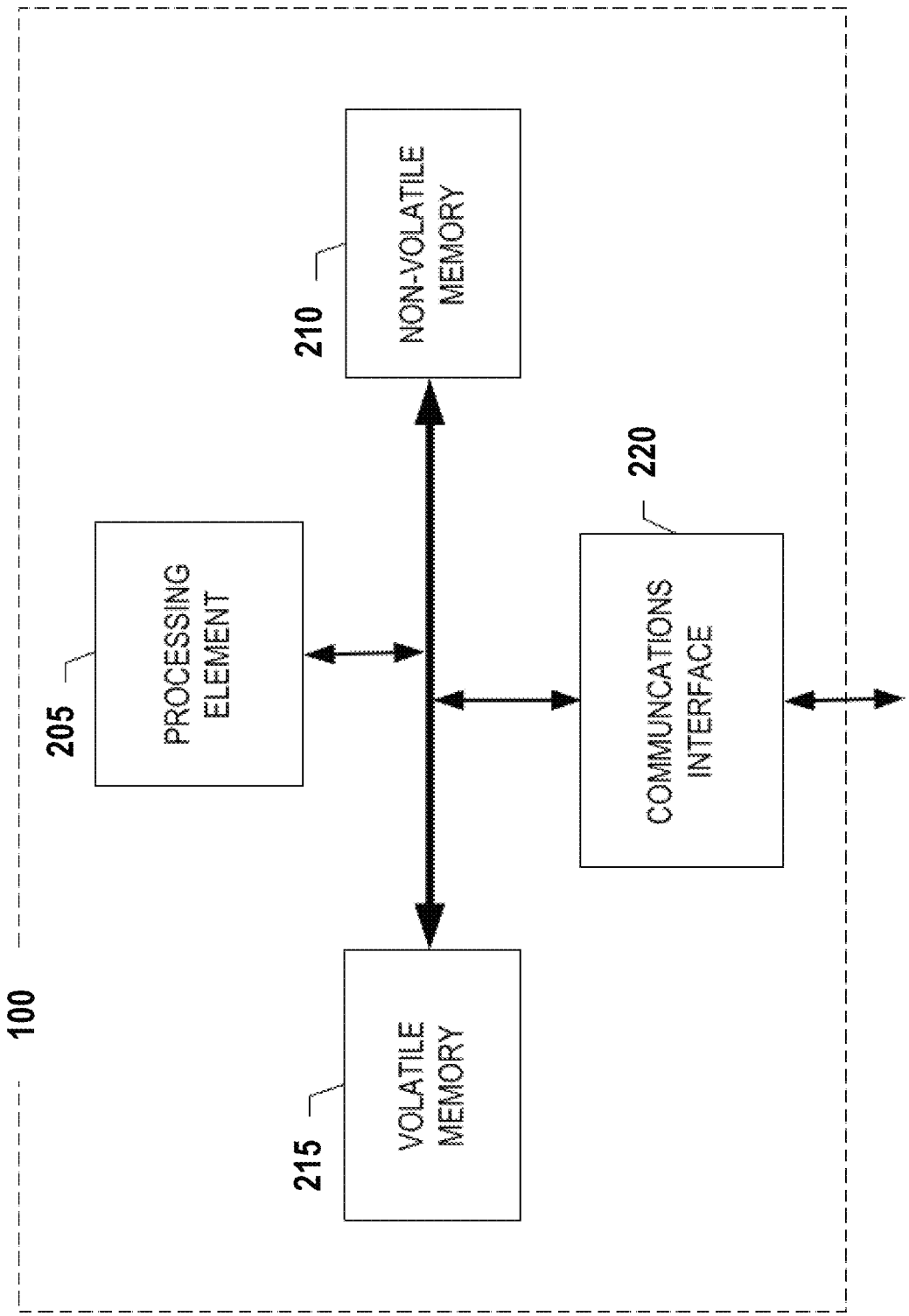
FIG. 2 is a diagram of a map database management entity that may be used in association with certain embodiments of the present invention.

FIG. 2 provides a schematic of a management computing entity 100 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user computing entities 110 to provide map data to the user computing entities 110 for use by one or more location-based services executing on or in communication with those user computing entities 110. In this regard, the management computing entity 100 may function as a map server or map host to provide the map data. The map data may include both source map data (e.g., map data that does not include generated cached map tiles) and cached map tiles as described above.

The management computing entity 100 may also be configured to manage a set of map data or a map database as described above. In this regard, the management computing entity 100 may be configured to receive updates to the map data. The management computing entity 100 may dynamically apply these updates to the set of map data as those updates are received, based on an update queue, or at various other intervals. In some embodiments, updates to map data may be received from user computing entities 110 during execution of a location-based service on the user computing entity 110. For example, a vehicle navigation system may include an interface capability to allow the user to indicate that a road has closed, that construction has completed, or that a navigation route has a detour. As another example, a surveying device may allow for the upload of survey data to mark or alter property boundaries, adjust the placement of navigation routes, or indicate the presence of geographic features.

These updates may be provided to the management computing entity 100 via one or more of the communications interfaces 220. Upon receiving an update to the set of map data, the management computing entity 100 may update records within the map data that are associated with the update. The management computing entity 100 may apply the updates to the map data, and indicate in a queue or log that those records have been updated. The log or queue may be employed in a process to update associated cached map tiles. An example of this process is described further below with respect to FIG. 4.

Once the received update has been applied to the source map data, the source map data may be sent to user computing entities 110 that request that map data in the future. In some embodiments, the management computing entity 100 may track which user computing entities 110 have recently requested map data for regions associated with the updated map data, and automatically propagate the newly updated map data to those user computing entities 110. Similarly, once the updates to the source map data are propagated to corresponding cached map tiles, those cached map tiles may be propagated to the user computing entities 110 via a similar process (e.g., upon the next request for map tile data for the associated region, immediately via a "push" notification, or the like).

As shown in FIG. 2, in one embodiment, the management computing entity 100 may include or be in communication with one or more processing elements 205 (also referred to as processors, processing circuitry, processing device, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include program instructions to facilitate the maintenance of a map database and propagation of map data to user computing entities 110. Maintenance of the map database may include, as described above, management of updates to map data stored in the map database and propagation of updates from source map data to associated cached map data in accordance with various embodiments as described herein.

The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system, such as management of a map database, transmission of map data to one or more user computing entities, and control of an update process for map data stored within the map tile database.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may employ the communications interfaces 220 for receiving requests for map data, receiving updates to map data, and for transmission of map data to one or more user computing entities 110. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity

100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
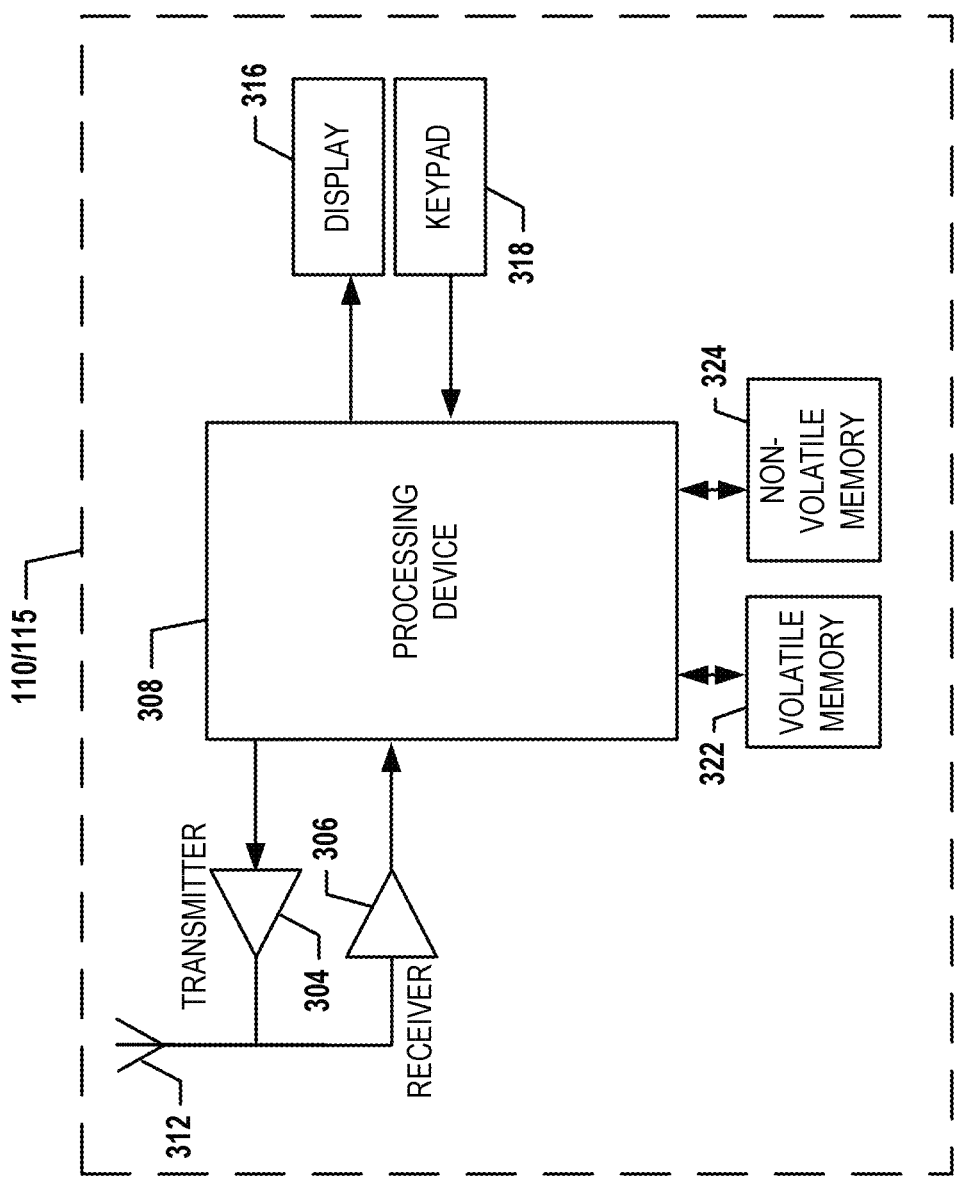
FIG. 3 is a schematic of a user computing entity in accordance with certain embodiments of the present invention.

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including any user or users of a location-based services system as described above. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As described above, the user computing entity 110 may execute or employ one or more location-based services applications or systems in communication with a management computing entity 100. The user computing entity 110 may receive map tile data from the management computing entity 100 and display said map tile data via the user interface and/or user input interface. The user interface and/or user input interface may be employed to view and access map tile data, route-finding data, and the like. Embodiments may also allow for updating or editing of map data via the user interface or user input interface, and transmission of said updated or edited data to the management computing entity 100. In some embodiments, the user interface may provide an interface for indicating how the edits should be made, entering user account credentials or login information for verification of updates, or the like.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100, mobile computing entity 115, and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

3. Exemplary Mobile Computing Entity

In one embodiment, a mobile computing entity 115 may include one or more components that are functionally similar to those of the management computing entity 100 and/or the user computing entity 110. For example, in one embodiment, each mobile computing entity 115 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the mobile computing entity 115 to interact with and/or cause display of information from the management computing entity 100, as described herein. This may also enable the mobile computing entity 115 to communicate with various other computing entities, such as user computing entities 110, and/or various other computing entities. As will be recognized, these architectures and descriptions are provided for exemplary purposes only and are not limiting to the various embodiments.

IV. EXEMPLARY SYSTEM OPERATION

Figure 4:
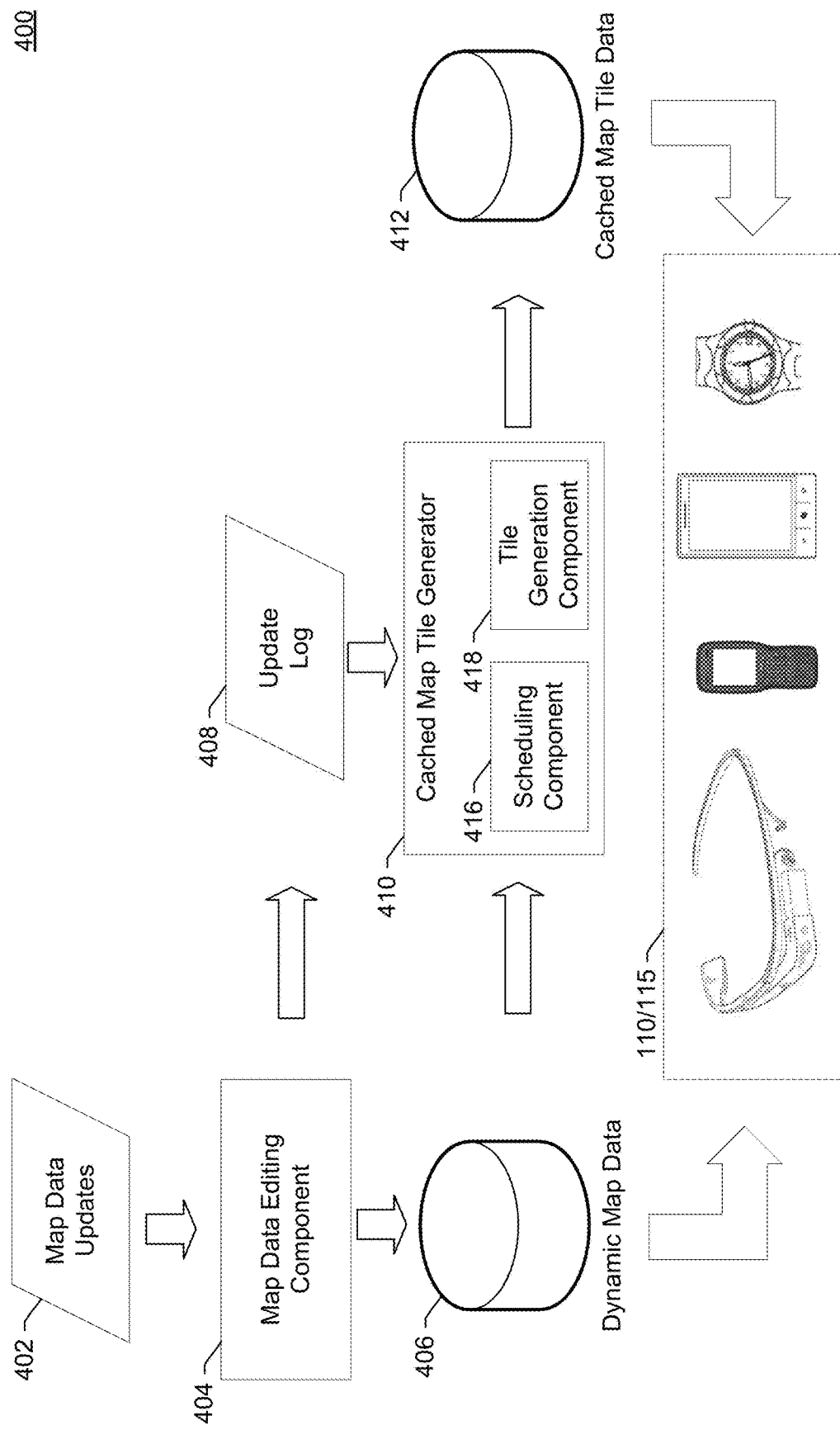
FIG. 4 is a diagram of a dataflow for selectively updating cached map tiles in accordance with certain embodiments of the present invention.
Figure 6:
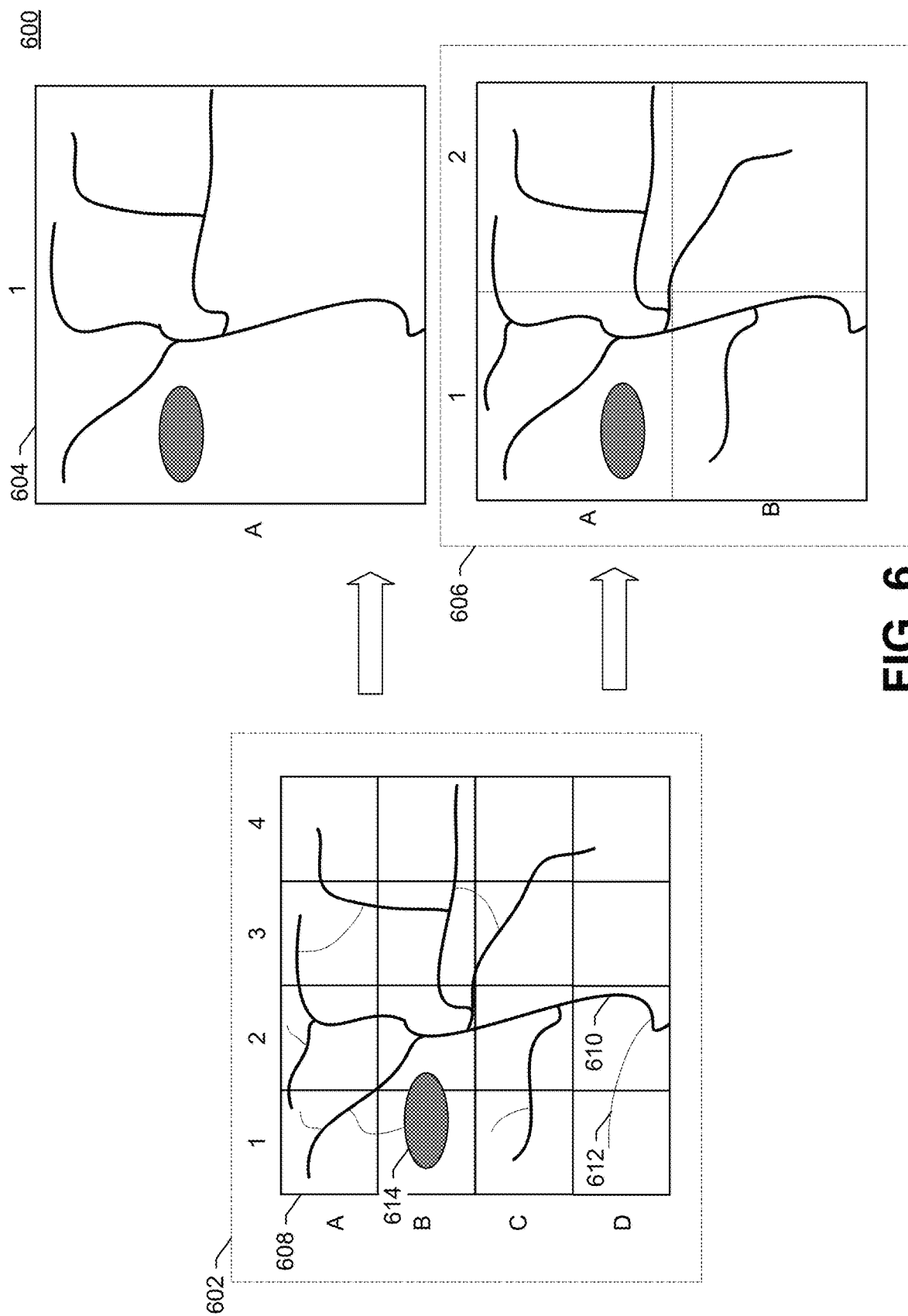
Figure 8:
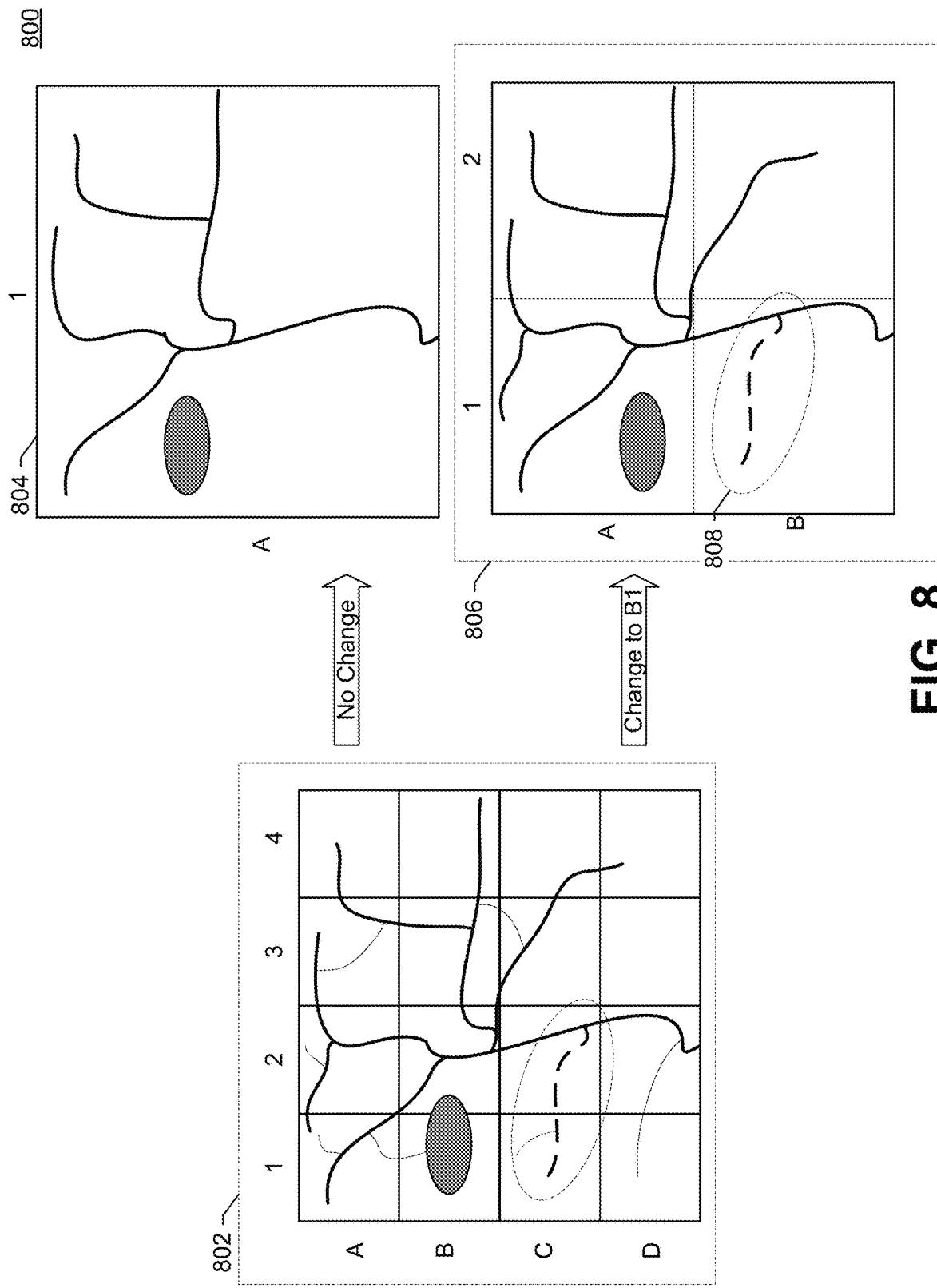
Figure 9:
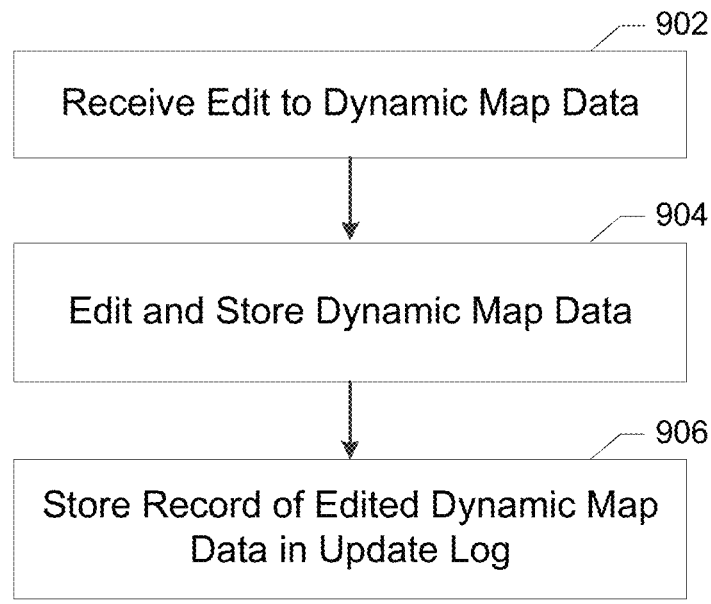
FIG. 9 is a flowchart illustrating operations and processes for editing a map tile database that can be used in accordance with various embodiments of the present invention.

Reference will now be made to FIGS. 4-9. FIG. 4 is an illustration of a dataflow for updating cached map tile data that can be used in accordance with various embodiments of the present invention. FIGS. 5-7 are illustrations of a cached map tile update workflow in accordance with embodiments of the present invention. FIGS. 8-9 depict flowcharts illustrating operations and processes that can be used in accordance with various embodiments of the present invention.

a. Exemplary Map Tile Data

As noted above, map tile data may include boundary, location, and attribute data corresponding to the map elements. As will be recognized, the map tile data can be stored using a variety of formats, layers, and/or the like—including shapefiles, ArcMaps, geodatabases, coverages, imagery, rasters, computer-aided drafting (CAD) files, other storage formats, and/or the like. For instance, a user computing entity 110 may store/record map data as a part of a digital map, e.g., as part of a feature layer, raster layer, service layer, icons/graphics layer, geoprocessing layer, basemap layer, satellite layer, street network layer, points of interest layer, service point layer, and/or the like. The term digital map is intended to include any map that can electronically display geographic areas. As will be described in greater detail below, the geographical maps and/or map information/data can be used to manage, create, modify, delete, add, and/or the like map elements to assigned areas, regions, routes, paths, and/or the like.

As will be recognized, map elements can be represented in digital maps as being accessible by one or more street networks or street segments of a street network. A "street network" is collection of street segments that comprise navigable, traversable, travelable, and/or similar words used herein interchangeably roads, streets, highways, paths, trails, walkways, entrance and exit ramps, bridges, sidewalks, alleys, and/or the like that can be used to access map elements. Similarly, map elements, street networks, and/or the like can be represented in digital maps as navigable/traversable/travelable segments or points for traveling to and/or from map elements.

In one embodiment, the user computing entity 110 and/or management computing entity 100 can store information/data associated with each map element in an object or other data structure. The object or data structure may comprise a variety of information/data associated with each map element, such as a consignee name, pickup or delivery identifier, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. Similarly, the user computing entity 110 and/or management computing entity 100 can store information/data associated with each street segment of the street network in an object or other data structure. The object or data structure may comprise a variety of information/data associated with each street segment, such as a street segment identifier, street name, street number range, street prefix, street suffix, street type, city, state, province, territory, country, postal code, street classification, directionals (e.g., one way <specific to which way> or both ways), longitude and latitude points defining the street segment, speed limits of one or more portions of the street segment, and/or the like. For example, in one embodiment, a map element may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the user computing entity 110 and/or management computing entity 100 may store digital maps. In another embodiment, the mapping/routing computing may be in communication with or associated with one or more mapping web sites/servers/providers/databases (including providers such as maps.google.com, bing.com/maps/, mapquest.com, Tele Atlas®, NAVTEQ®, and/or the like) that provide map information/data of digital maps to a variety of users and/or entities. Using the digital maps, an appropriate computing entity can provide map information/data, for example, about map elements (e.g., their locations, attributes, and/or the like) and/or their corresponding street networks based on map information/data. An appropriate computing entity (e.g., the management computing entity 100 or the one or more mapping websites/servers/providers/databases) can also provide map information/data, for example, about the geographic areas, regions, groupings, routes, paths, regions, and/or similar words used herein interchangeably about the different locations on the street networks. For instance, the map information/data may include a route for delivering one or more items to different locations, the most efficient order for delivering items to the locations, directions for traveling to and/or from the locations, the estimated distance for traveling to and/or from the locations, the expected time for traveling to and/or from the locations, and/or the like. The map information/data may also include other information/data about map elements and/or traveling to and from locations, such as current estimated speeds for associated street segments, historical speeds for associated street segments, nearest street segments, posted speed limits for associated street segments, interpolated locations of map element s, reverse geocoded locations of map element s, latitude and longitude points of map element s, distances between various map element s, directions, stop orders, and/or the like. Certain examples of these types of information/data are described in U.S. Publ. No. 2013-0304349, which is hereby incorporated in its entirety by reference.

In one embodiment, although not necessary, the map information/data, map element information/data, route information/data, and/or the like can be provided to the user computing entity 110 in a variety of ways and using various formats. For instance, the mobile computing entity 105 (or other appropriate device) may provide turn-by-turn navigation to the driver of a vehicle for traveling between each stop (e.g., a pickup, delivery, or visit at a location). As will be recognized, a variety of other techniques and approaches can be used to adapt to various needs and circumstances.

In one embodiment, the user computing entity 110 can identify, retrieve, determine, and/or similar words used herein interchangeably map information/data associated with the map elements, street networks, routes, paths, and/or the like. For example, the mapping/routing computing entity 110 can identify the map elements by address, address portions (e.g., street number, street name, type, and/or the like), latitude and longitude points, routes, paths, geographic areas, location identifiers, and/or the like. Table 1 below shows a textual view of eighteen map elements, each associated with a route, a stop, an address, a city, a state, a longitude and latitude, and/or the like.

TABLE 1

| Route: Stop | Address | City | State |
|---|---|---|---|
| R1: 1 | 1 STREET ADDRESS | ANYTOWN | GEORGIA |
| R1: 2 | 2 STREET ADDRESS | ANYTOWN | GEORGIA |
| R1: 3 | 3 STREET ADDRESS | ANYTOWN | GEORGIA |
| R1: 4 | 4 STREET ADDRESS | ANYTOWN | GEORGIA |
| R1: 5 | 5 STREET ADDRESS | ANYTOWN | GEORGIA |
| R1: 6 | 6 STREET ADDRESS | ANYTOWN | GEORGIA |
| R2: 1 | 7 STREET ADDRESS | ANYTOWN | GEORGIA |
| R2: 2 | 8 STREET ADDRESS | ANYTOWN | GEORGIA |
| R2: 3 | 9 STREET ADDRESS | ANYTOWN | GEORGIA |
| R2: 4 | 10 STREET ADDRESS | ANYTOWN | GEORGIA |
| R2: 5 | 11 STREET ADDRESS | ANYTOWN | GEORGIA |
| R2: 6 | 12 STREET ADDRESS | ANYTOWN | GEORGIA |
| R3: 1 | 13 STREET ADDRESS | ANYTOWN | GEORGIA |
| R3: 2 | 14 STREET ADDRESS | ANYTOWN | GEORGIA |
| R3: 3 | 15 STREET ADDRESS | ANYTOWN | GEORGIA |
| R3: 4 | 16 STREET ADDRESS | ANYTOWN | GEORGIA |
| R3: 5 | 17 STREET ADDRESS | ANYTOWN | GEORGIA |
| R3: 6 | 18 STREET ADDRESS | ANYTOWN | GEORGIA |

The user computing entity 110 can also identify the interpolated or reverse geocoded locations on the street networks for one or more of the locations, for instance. And, the mapping/routing computing entity 110 can reverse geocode the latitude and longitude points of the locations if available, such as the location of 1 Street Address, Anytown, GA being located at 33.7869128, −84.3875602. As will be recognized, a variety of other techniques and approaches can be used to adapt to various needs and circumstances.

The user computing entity 110 may also be configured to receive updates to one or more map elements, such as changes to the street network, edits to the coordinates of a particular street address, or the like. These updates may be received via a user interface executing on the user computing entity 110. Upon receiving these updates, the updates may be propagated to a management computing entity 100 for verification and/or updating map data managed by the management computing entity 100.

The information/data about map elements, routes, paths, regions, geographic areas, street networks, street segments, directions, altitudes, longitudes, latitudes, speed limits, direction restrictions, and/or the like can be collected in a variety of ways, including by receiving user input to "draw" on a map displayed in a user interface, by manual entry of a change (e.g., selecting two addresses to be switched), by automatic capture of a location by the user computing entity 110 (e.g., capturing the coordinates from a GPS receiver coupled to the user computing entity 110 and associating those coordinates with an entered address), or the like. Embodiments of a dataflow for propagating these updates to a set of map tile data are described further with respect to FIG. 4.

b. Exemplary Map Tile Update Dataflow

FIG. 4 illustrates an exemplary dataflow 400 for selectively updating cached map tile data in accordance with certain embodiments of the present invention. The dataflow 400 illustrates how a set of map data updates 402 are provided to a map data editing component 404, and then used to update a set of dynamic map data 406 and a set of cached map tile data 412. The dynamic map data 406 and the cached map tile data 412 may be provided to one or more user computing entities 110/115 as described above.

Map data updates 402 may be received by a map data editing component 404. As described above, the map data updates 402 may be received from a variety of sources in a variety of formats. For example, map data updates 402 may be provided by a user computing entity 110 executing a location-based service that allows the user to indicate changes to map tile data. Alternatively, in some embodiments map data updates 402 are generated programmatically by user computing entities 110, such as by detecting when the user computing entity 110 is traveling on a route not associated with a street network to identify newly constructed roads. In yet further embodiments, map data updates 402 may be received from other servers, entities, applications, or systems other than user computing entities 110.

The map data updates 402 may be provided to a map data editing component 404 to be propagated to a set of dynamic map data 406. The dynamic map data 406 refers to a set of map data that includes data structures, records, or other information indicating map elements for a particular geographical area. This is in contrast to the cached map tile data 412, which represent a series of images that are derived from the dynamic map data 406. The dynamic map data 406 may be directly edited by the map data editing component 404 to reflect the map data updates 402 received by the map data editing component 404. For example, one or more records or data structures of the dynamic map data 406 may be altered to add or remove map elements, points of interest, road network segments, geographic features, or the like based on the received map tile updates. These updates may be performed on the dynamic map data 406 at particular intervals (e.g., periodically), in response to receiving the map data updates (e.g., on-demand), or according to various other schedules.

The map data editing component 404 may be configured to manage the propagation of the map data updates to the dynamic map data 406. For example, the map data editing component 404 may include account credential verification systems to verify that the map data updates 402 are provided by authorized users. In some embodiments, the map data editing component 404 may delay or "gate" propagation of map tile updates 402 to the dynamic map data 406 until particular conditions have occurred. For example, the map data editing component 404 may delay propagation of updates until a threshold number of updates with the same or similar content have been received from multiple different sources, or updates may be delayed or prevented unless and until the user submitting the map data updates 402 can be verified as an authorized user. The term "dynamic" may be employed with respect to the dynamic map data 402 to describe the ability of elements of the map data to be updated individually. This term is used solely to contrast the dynamic map data 406 with the cached map tile data 412, and should be understood only to refer to the ability of such map data to be directly edited as opposed to separately derived from other map data.

Upon updating the map data of the dynamic map data 406, the map data editing component 404 stores a record of the update in an update log 408. The update log 408 includes a record of which elements of the dynamic map data 406 were updated and when the update occurred. For example, the update log 408 may include a unique identifier for each map element of the dynamic map data 406 updated when propagating the map data updates 402 to the dynamic map data 406. In some embodiments, the unique identifier may be coordinates associated with the updated map data, such as latitude and longitude coordinates, of each updated data element, or the like.

A cached map tile generator 410 accesses the tile update log 408 and the dynamic map data 406 to manage the generation and/or modification of a set of cached map tile data 412. The cached map tile data 412 includes one or more map tiles that are derived from the map data. For example, the cached map tile data 412 may include map tiles derived from the dynamic map data 406 or other cached map tiles stored in the cached map tile data 412.

As noted above, the cached map tile data 412 includes cached map tiles that contain fewer map elements than the source map data from which the cached map tiles are derived. In some embodiments, these cached tiles are "zoomed out" images. In other embodiments, these cached tiles are used for display within a user interface as placeholders or static images that do not have corresponding route-finding information or other map elements. Accordingly, these cached map tiles allow for display or presentation of a reduced set of map tile data that advantageously reduces the amount of memory and network bandwidth used by a user computing entity 110 displaying the cached map tile data as compared to loading the source map tile data that corresponds to the same region.

A typical use case for such cached map tile data would be when a user zooms out of an interface displaying the map tile data. When zoomed out to display a large geographic region, map elements associated with individual points of interest or road network segments associated with smaller "back roads" may not be visible due to screen resolution constraints. Such elements may also not be desirable to display due to screen congestion. Accordingly, display of a reduced representation of the map elements corresponding to the region is desirable, both to enhance the user experience and to reduce the transmission bandwidth and memory usage of map elements that are not relevant at the selected zoom level. To this end, the cached map tiles may be associated with particular geographic regions, particular screen display resolutions, particular map element resolutions (e.g., a resolution of the minimum size map element included in the tile), or the like that control when a particular cached map tile is used as opposed to the source map tiles from which the cached map tile is derived. In some embodiments, the cached map tiles 412 are associated with particular zoom levels of a display of a navigation system. When the navigation system is displaying a map interface below a threshold zoom level, the navigation system may dynamically generate map tiles from map data associated with a displayed geographical region. When the navigation system is zoomed out past the threshold zoom level, the cached map tiles 412 associated with that zoom level may be displayed within the interface instead of dynamically generated map tiles from the map data. As noted above, it should be appreciated that the dynamic map data 406 may represent source map data. In many cases, map tiles generated from the dynamic map data 406 may therefore represent the "lowest level" or highest resolution of available map data.

The cached map tile generator 410 facilitates generation of the cached map tile data 412. The cached map tile generator 410 may include a scheduling component 416 and a tile generation component 418. The scheduling component 416 may access the tile update log 408 to determine which tiles have received updates and how many such updates are pending. The scheduling component 418 may initiate generation or editing of one or more of the cached map tile data 412 based on the contents of the tile update log 408. For example, the scheduling component 418 may access the update log 408 periodically (e.g., every 30 minutes, every 60 minutes, every 6 hours, every 24 hours), and cause the tile generation component 418 to generate or regenerate any cached map tiles associated with data indicated in the update log 408 at that interval. Alternatively, the scheduling component 416 may establish a queue for the update of cached map tiles, such that the tile generation component 418 processes the next item in the queue at periodic intervals, as cached tile updates are completed, or the like. In some embodiments, the update log 408 may function as this queue, with the scheduling component 416 and/or the tile generation component 418 consuming entries from the update log 408 as the appropriate cached tiles are updated.

The tile generation component 418 may be operable to receive an indication that data associated with a particular map tile has been updated. The indication that the associated map data has been updated may be received from the scheduling component 416 in response to detection of an entry in the update log 408 by the scheduling component 416, or the scheduling component 416 may cause the tile generation component 418 to access the update log 408 to determine which tile or tiles are associated with the update. The tile generation component 418 may then identify which cached map tiles are associated with the updated map data. In some embodiments, cached map tiles have geospatial associations with particular source map elements (e.g., roads, geographic elements, or the like). For example, the coordinates of the corners or other reference points of roads, geographic elements, or points of interest associated with the updated map data may be indicated, and the tile generation component 418 may be configured to identify which cached map tiles are associated with at least one of those coordinate reference points.

In some embodiments, the tile generation component 418 may operate to recursively update other cached tiles that are dependent upon cached tiles updated by the tile generation component 418. For example, when a change is made to the dynamic map data 406, the tile generation component 418 may regenerate or update cached tiles that use the updated elements of the dynamic map data. Following this update, the tile generation component 418 may automatically evaluate any cached tiles that were regenerated or updated, to determine if those cached tiles function as a source for other cached map tiles. This process may continue until no cached tiles remain that use any data updated by the tile generation component 418.

To generate the cached map tiles, the tile generator component 418 may generate one or more images corresponding to the source map data for the particular cached map tile being generated. This process may include "stitching" images associated with cached map tiles together to create a single image containing some or all of the image data contained in the images associated with the cached map tiles. An example process for generating cached map tiles in this manner is described further below with respect to FIGS. 5-8. The images associated with the cached map tiles may be generated based on processing of the dynamic map data. These images may be any form of digital image, including but not limited to images stored in a Joint Photographic Experts Group (JPEG/JPG), Graphics Interchange Format (GIF), Tagged Image File Format (TIFF), Portable Network Graphic (PNG), or various other image storage formats.

The generated cached map tile may include an image at the same or a lower resolution than corresponding images associated with the source map tiles. For example, a square cached map tile image may have a total resolution of 128×128 pixels, generated from a set of four smaller cached map tile images, each with a resolution of 128×128 pixels. Accordingly, generation of the cached map tile image may include compression or other techniques for reducing the image resolution from an aggregation of the source images (which, stitched together at their native resolution, would generate an image having a resolution of 256×256 pixels). In this manner, an image for a cached map tile may have a lower resolution than the aggregation of corresponding image files used to generate the cached map tile.

In some embodiments, the tile generator component 418 may also selectively remove or ignore particular map elements of the source map tiles when generating the cached map tiles. For example, particular road segments included in the source map data may not be included in cached map tiles generated from that source map data. Selection of particular map elements to be removed or otherwise not included in the cached map tile may be controlled by a variety of factors, including but not limited to the geographic area of the cached map tile, the relative physical size or shape of map elements as compared to the geographic area associated with the cached map tile, a zoom level at which the cached map tile is designed to be displayed, the resolution of an image associated with the cached map tile, the relative importance of the particular map element (e.g., whether a road segment is an interstate or a back road), the relative size of the map element (e.g., whether the map element is a 2 lane road or a 6 lane road), or the like.

Updating the cached map tile data in this manner advantageously reduces the processing resources required by the update operation, as only cached map tiles impacted by changes from map data updates are regenerated. The cached map tile generator 410 may also throttle update operations to limit the number of cached map tiles updated at any given time. Throttling of updates in this manner prevents monopolization of the cached map tile data 412 for lengthy periods of time, preventing scenarios where the update operation has a negative impact on other processes that access the cached map tile data 412 (e.g., requests from user computing entities for cached map tile data). Embodiments of the cached map tile generator 410 may also employ various rules and methodologies for controlling updates to the cached map tile data 412, such as updating a particular map region or group of map tiles at a given time, controlling the order in which updates are applied from the tile update log, and the like. Various processes for receiving the map tile updates and propagating said map tile updates to the cached map tile data are described further below with respect to FIGS. 9-10.

The dynamic map data 406 and/or cached map tile data 412 may be provided to one or more user computing entities 110/115 as described above. These user computing entities 110/115 may employ the dynamic map data 406 and/or cached map tile data 412 for providing location-based services as described above.

c. Exemplary Map Tile Relationships

FIGS. 5-8 illustrate the relationships between source map data and cached map tiles during a map tile update operation in accordance with certain embodiments of the present invention. These illustrations depict map tiles and their corresponding map elements, and the manner in which changes to source map data may be propagated to cached map tiles. These map tile update operations may be facilitated by a management computing entity 100, and through the use of a map data editing component 404 and a cached map tile generator 410 as described above.

FIG. 5 illustrates a process for generating one or more cached map tiles 504 from a set of map data 502. As noted above, a set of dynamic map data may be employed to generate a set of map tiles that include points of interest, road networks, and other map elements referenced by the dynamic map data. In some embodiments, map tiles may be generated dynamically by a navigation system, such as in scenarios where the navigation system is displaying the map data below a zoom level threshold. In other embodiments, cached map tiles may be generated "offline" or prior to display for scenarios where a larger geographic region is displayed (e.g., a region that corresponds to more map data). By using cached tiles in this manner instead of dynamically generated tiles, embodiments reduce memory and processor usage, as larger regions are generally associated with more map data and thus take longer and utilize more resources to render corresponding map tiles for display.

To generate the cached map tiles 504, the dynamic map data 502 may be processed to identify points of interest, road segments, and other map elements, along with corresponding geographic locations for those map elements. Visual representations (e.g., icons or colors) of these map elements may be placed at a portion of an image that corresponds to their geographic location, such that the visual representations, displayed together, result in a map of a geographic region. In the present example, the set of cached map tiles 504 includes 16 tiles generated from the dynamic map data 502.

FIG. 6 illustrates a tile relationship 600 between a set of source map data 602 (depicted here as a set of tiles in order to show the corresponding map elements, though it should be appreciated that map data may or may not be stored in a tile format), a first cached map tile 604, and a set of cached map tiles 606. The set of source map data 602 corresponds to a set of 16 individual map tiles 608, labeled according to coordinates A-D and 1-4. It should be appreciated that, while in the present example map tiles are displayed as square regions, in various embodiments other map tile structures may be employed, such that the map tiles may be irregular in shape, the map tiles may have different side lengths, and that the map tiles may feature curved sides. The set of source map data 602 includes map elements defining a road network and a body of water 614. The road network includes various road segments of different size and/or importance, including one or more major roads 610, and one or more back roads 612.

The first cached map tile 604 represents the reduction of the set of source map data 602 into a single cached map tile 604. The cached map tile 604 includes the most significant or important elements from the aggregation of the 16 map tiles (arranged in a 4×4 grid) represented in the set of source map data 602. It should be appreciated that, as described above, various different processes, techniques, and selection algorithms may be employed to determine which elements to include in the first cached map tile 604 (e.g., major roads and the body of water 614), and which elements to omit (e.g., the back road 612). In some embodiments, the cached map tile may only include an image corresponding to the aggregation of images associated with the set of source map data 602 or generated from the set of source map data 602, and, as noted above, in some embodiments the image associated with the cached map tile data may be reduced in resolution or certain map elements may be omitted from the image according to the various techniques employed to generate the image.

The set of cached map tiles 606 represents the reduction of the set of source map data 602 to a grid of 2×2 map tiles. Each of the cached map tiles (labeled along axes A-B and 1-2), corresponds to a region associated with the depicted set of four map tiles 602. For example, cached map tile A1 of the set of cached map tiles corresponds to the geographic regions defined within tiles A1, B1, A2, and B2 of the set of source map data, cached map tile A2 corresponds to A3, A4, B3, and B4 of the set of source map data 602, cached map tile B1 corresponds to C1, C2, D1, and D2 of the set of source map data 602, and cached map tile B2 corresponds to C3, C4, D3, and D4 of the set of source map data 602.

In this example, some of the back roads, such as the back road 612 have been removed in the set of cached map tiles 606, but more of the road segments remain than in the first cached map tile 604, which represents a lower resolution cached tile. In this regard, transmission of the first cached map tile 604 would require less bandwidth and a lower memory footprint than transmission of the set of four cached map tiles 606, which in turn would require less bandwidth and a lower memory footprint than transmission of the entire set of source map data 602.

Creation of the first cached map tile 604 and the set of cached map tiles 606 may be performed by a tile generation component 418 as described above. It should be appreciated that, in some embodiments, the first cached map tile 604 may also be generated using the set of cached map tiles 606 as source map data. Such a process would operate in scenarios where the generated cached map tile has the same or a lower resolution than the cached map tiles used as a source. It should also be appreciated that the process of generating a cached map tile may be faster when another cached map tile is used.

FIG. 7 illustrates an example edit operation 700 performed to a set of source map data (e.g., application of a map data update 402 as described above with respect to FIG. 4). In this example, the set of source map data 702 has received an update to remove a road segment 704. For example, the update may indicate that the road segment 704 is closed or under construction. In the present example, the road segment to be removed 704 runs through map tiles C1 and C2. Accordingly, removal of the road segments requires updating of these two map tiles. Application of the update to the map tile data results in the set of map tile data 706, which reflects the removal of the road. Upon causing removal of the road, embodiments of the present invention may note the affected tiles (C1 and C2) to an update log 408 such as described above with respect to FIG. 4.

FIG. 8 illustrates the effect of an operation for updating corresponding cached map tiles 800 in response to the edit operation described above with respect to FIG. 7. As noted above, the edit operation impacted a geographic region associated with map tiles C1 and C2 as depicted in a set of map tiles 802. As described, embodiments may log these updates to an update log, indicating the update performed, which geographic coordinates are impacted, the time of the update, and the like. In response, a cached map tile generator 410 may determine which cached map tiles to update.

In the present example, the map tiles C1 and C2 are associated with a first cached map tile 804, and cached tile B1 of a set of cached tiles 806. Accordingly, embodiments may identify the change to cached tile B1 of the set of cached tiles 806, and update tile B1 to remove the road as indicated by element 808. However, the first cached tile 804 illustrates how, in some embodiments, even cached tiles which correspond to updated tiles may be excluded from a cached tile update process. In this example, the first cached tile 804 has a lower resolution or is associated with a zoom level that does not display the road associated with the edited region, such that the deleted road is not reflected in the first cached tile 804. Accordingly, since the road is not displayed, the first cached tile does not need to be updated or regenerated.

In some embodiments, the update log 408 may include metadata about updates that have occurred, such that the metadata may be employed when selecting particular cached tiles for update to prevent unneeded regeneration of cached map tiles. For example, an update operation to edit a road segment may indicate the size of the road, the relative importance of the road (e.g., interstate or back road), the number of lanes, a zoom level at which the road should be displayed, or the like, and cached map tiles may be associated with certain classes of map elements or map element metadata. If the cached map tile does not include the updated element, then the cached map tile may not be identified for an update. Selection of particular tiles in this manner may be performed by a cached map tile generator as described above with respect to FIG. 4.

d. Exemplary Map Tile Update Processes

FIG. 9 illustrates an example of a process 900 for receiving an update to source map data (e.g., dynamic map data as described above) in accordance with certain embodiments of the present invention. The process 900 illustrates how embodiments operate to receive updates to a set of map data which may subsequently be used to generate cached map tiles. In this manner, embodiments advantageously provide for the ability to apply dynamic updates in real-time, while logging these updates to control and schedule updating of impacted cached map tiles at a later time. The process 900 may be performed by a map data editing component 404, which operates within or in communication with a management computing entity 100 as described above.

At action 902, the process 900 receives one or more edits to dynamic map data as described above with respect to FIGS. 3 and 4. As noted above, these edits may be provided from various sources, including but not limited to user computing entities 110, external map databases, programmatically determined from other data sources (e.g., by analysis of traffic data, zoning and construction permits in public record databases), or the like.

At action 904, the dynamic map data is updated according to the edits received at action 902. For example, the updates may cause addition, deletion, or editing of road segments, addition of geographic features, movement of street addresses, addition or deletion of points of interest, or the like. Upon making the updates, the updated dynamic map data may be stored in a set of dynamic map data, such that the updated dynamic map data may be propagated for use. In this manner, embodiments may advantageously function to make updates to dynamic map data available immediately, without delaying access to the most updated data while associated cached map tiles are regenerated.

At action 906, upon making the edits to the dynamic map data, data may be stored in an update log to note those updates. The data stored in the update log may include, for example, identifiers for updated map elements, an indication of the geographic coordinates of the updated map elements, the type of map element updated, the date/time at which the update was received, the date/time at which the update was performed, the source device or system that caused the update, a user that generated the update, a user computing device that created the update, or the like. The process 900 completes after storing the data in the update log, until another set of updates to the dynamic map data is received.

Figure 10:
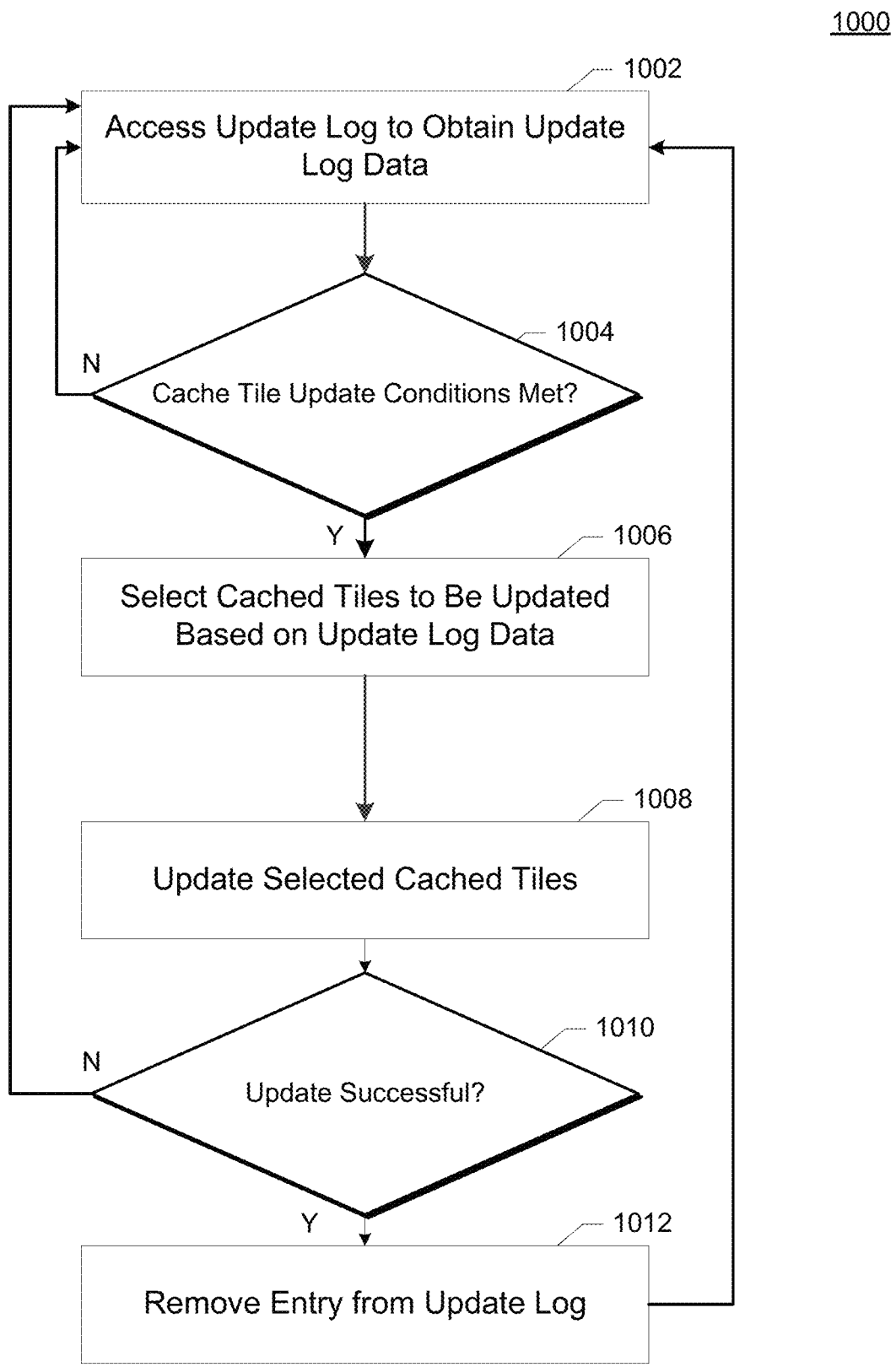
FIG. 10 is a flowchart illustrating operations and processes for selectively updating cached map tiles that can be used in accordance with various embodiments of the present invention.

FIG. 10 illustrates an example of a process 1000 for selectively controlling the generation/regeneration of cached map tiles in accordance with certain embodiments of the present invention. The process 1000 illustrates how embodiments may function to select particular cached map tiles for updates based on data stored in an update log, and how the process 1000 may schedule those updates to manage the rate at which said updates occur, manage the status of said updates, and verify that said updates have been properly completed. The process 1000 may be performed by a cached map tile generator 410 as described above with respect to FIG. 4, which may function as a component of or in communication with a management computing entity 100 as described above with respect to FIGS. 1-2.

At action 1002, the process 1000 accesses an update log, such as the update log 408 described above with respect to FIG. 4. As noted above, the update log 408 may function as an update queue, with items from the update log 408 consumed by a cached map tile generator as described above. In some embodiments, accessing the update log may include retrieving a list of all updated dynamic map data map elements, a particular number of updated dynamic map data elements (e.g., 5 entries at a time, 10 entries at a time, or the like), or various metadata regarding the update log (e.g., a number of entries pending in the update log, a number of unique separate map element identifiers that have been applied, or the like).

At action 1004, the process 1000 may determine if criteria have been met to perform a cached tile update operation for any map data updates stored in the update log. It should be appreciated that, in some embodiments, the update log may not be accessed until said criteria are met, such as in cases where the criteria specifies a particular time period (e.g., check the tile update log every hour, every 3 hours, every 6 hours, or the like), or cases where the update operation is performed in response to a particular trigger (e.g., a notification received from a map tile editing component upon receipt of a map tile update). Example criteria may include, but are not limited to, a minimum number of entries being present in the update log, a minimum number of unique map elements or cached map tiles being associated with entries in the update log, a particular time period having elapsed, a particular time period having elapsed since the last update, a certain amount of computer resources being available (e.g., database availability, processor utilization being below a certain threshold, a minimum memory being available, or the like), or the like. If the criteria have been met, the process proceeds to action 1006. Otherwise, the process returns to action 1002 to continue to monitor the update log until the criteria have been met. In this manner, embodiments may advantageously ensure that cached tiles are updated and/or regenerated in a manner that does not impact the performance of other functionality of the system, but which also allows the flexibility to propagate updates when appropriate.

At action 1006, the process 1000 identifies and selects cached map tiles associated with the dynamic map tile(s) indicated in the tile update log accessed at action 902. As described above, identification of the cached map tiles may be performed by identifying cached map tiles which have a geospatial association with the updated dynamic map data. In some embodiments, identification of associated cached map tiles may be performed in a recursive manner, where updated cached map tiles are examined to determine whether the updated tiles are source map tiles for other cached map tiles. Identification of associated cached map tiles may also include determining whether certain metadata values associated with the given map data update(s) are relevant for identified cached map tiles. For example, an update to a back road would not be relevant to a particular cached map tile that does not include back roads, even if the updated map tile is used as a source map tile for the particular cached map tile. Accordingly, the particular cached map tile would not be identified for update/regeneration in embodiments that take into account such metadata.

Selection of cached map tiles for update may also include examination of a timestamp associated with the last time the cached map tile was updated. If the timestamp indicates that the cached map tile was updated subsequent to the time at which the entry was made to the update log, then the cached map tile may not be selected for update because the latest update already incorporates the change to the dynamic map tile indicated in the update log.

At action 1008, the process 1000 updates the cached map tiles identified at action 1006. As described above, updating of the identified cached map tiles may include removing one or more map elements according to a configuration of the particular cached map tile, "stitching" together source map tiles that make up the components of a given cached map tile, adjusting the resolution of images associated with the source map tiles and generating a corresponding image, or the like.

At action 1010, the process 1000 determines whether the update was successful. A cached tile update process may fail for a variety of reasons. For example, in some embodiments, multiple separate execution threads or processes may consume entries from the update log. In some cases, these separate threads may attempt to cause two or more edits to the same cached map tile. Embodiments may implement concurrency locks, semaphores, and other constructs to prevent accidental overwriting of tile updates. In such a case, the second process to access the cached map tile might fail with a concurrency error.

If the process 1000 has failed to complete the update operation, the process 900 proceeds to action 1002, and returns to the update log. In such a case, the corresponding entry from the update log may remain in the update log, be placed at the end of a queue maintained in the update log, or the like. It should be appreciated that the failure of an update operation will generally result in the entry remaining in the update log, though in some embodiments such entries may be removed in response to a failure, in response to repeated failures (e.g., after 3 or more failures, an error may be logged), or the like. As another example, if an updated cached tile is indicated as a source tile for another cached tile, the update operation may recursively continue until all impacted cached tiles are updated. However, in the event of a circular dependency or other improper tile dependency, the update operation may be unable to complete properly. As such, the update operation may terminate with a failure state after a particular period of time.

If the update is successful, at action 1012, the entry is removed from the update log, as the update to the corresponding cached tiles has been completed. At that time, the process 1000 may return to action 1002 to access the next entry in the update log and continue updating of the cached tiles.

It should be appreciated that various additional and alternative functions, techniques, and refinements may be applied to the process 1000 described in FIG. 10. For example, embodiments may, as noted above, utilize multiple parallel processing threads to consume entries from the tile update log and update corresponding cached tiles. In some embodiments, particular processes may be associated with particular geographic regions which are associated with particular dynamic map tiles.

In certain embodiments, a waiting period may be implemented after receiving an update for a particular map element, geographic region, or map tile, to ensure maximum efficiency when updating related cached tiles. In such cases, the process may aggregate updates to a particular region, portion of dynamic map data, or group of map tiles and apply all of the aggregated updates to associated cached map tiles at a particular time. An update to a particular portion of the dynamic map data may flag adjacent dynamic map data regions or other dynamic map data within a particular threshold geographic distance of the particular portion of the dynamic map data, such that when the entry associated with the particular portion of dynamic map data is performed, update log entries associated with the other changed dynamic map data are also marked as complete.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
accessing an update log from one or more servers to retrieve electronic update data associated with at least one software update applied to a set of dynamic map data, the set of dynamic map data associated with at least one geographic region, wherein the electronic update data includes one or more updates to one or more map elements;
associating, by the one or more servers, based on the electronic update data, one cached map tile with the at least one software update, the one cached map tile comprising a first representation of at least one image including the one or more map elements corresponding to the one or more map elements included in the electronic update data, wherein the first representation is a first rendering of the set of dynamic map data prior to application of the at least one software update applied to the set of dynamic map data;
applying the at least one software update to the set of dynamic data for the one cached map tile to generate an updated cached map tile, wherein applying the at least one software update changes the set of dynamic data by modifying the one or more map elements corresponding to the one or more map elements included in the electronic update data to yield the updated cached map tile;
generating by the one or more servers the updated cached map tile, wherein the updated cached map tile comprises a second representation of the at least one image of the one cached map tile including the modified one or more map elements, wherein the second representation reflects the at least one image subsequent to application of the at least one software update applied to the set of dynamic map data;

storing the updated cached map tile in a memory of the one or more servers, wherein the cached map tile is associated with a plurality of cached map tiles, which means the cached map tile corresponds to the plurality of cached map tiles, and wherein the plurality of cached map tiles include one or more cached map tiles where the updated cached map tile is a source map tile that includes source map data to generate the one or more cached map tiles.

2. The method of claim 1, further comprising providing the updated cached map tile in response to a request for map tile data associated with the at least one geographic region.

3. The method of claim 1, further comprising accessing the update log at a periodic interval.

4. The method of claim 1, wherein the at least one software update comprises an edit to a road segment.

5. The method of claim 1, wherein the electronic update data comprises a type of update, and wherein the one cached map tile is determined at least in part based on the type of update.

6. The method of claim 1, wherein the cached map tile is determined in response to at least one of the plurality of cached map tiles being associated with the at least one software update.

7. The method of claim 1, wherein the cached map tile comprises a zoomed out representation of the plurality of cached map tiles.

8. The method of claim 1, wherein the cached map tile corresponding to a portion of the geographic region associated with the update to the set of dynamic map data comprises fewer of the one or more map elements than a portion of the set of dynamic map data associated with the portion of the geographic region.

9. The method of claim 1, wherein the update log comprises a queue for application of updates to a set of cached map tile data.

10. The method of claim 1, wherein the one cached map tile is determined in response to the update log having at least a threshold number of entries.

* * * * *